United States Patent  (10) Patent No.: US 6,372,097 B1
Chen  (45) Date of Patent: Apr. 16, 2002

(54) METHOD AND APPARATUS FOR EFFICIENT SURFACE GENERATION OF PURE O₃

(75) Inventor: Yee Yvonne Chen, Austin, TX (US)

(73) Assignee: Chen Laboratories, Austin, TX (US)

( * ) Notice: Subject to any disclaimer, the term of this patent is extended or adjusted under 35 U.S.C. 154(b) by 0 days.

(21) Appl. No.: 09/549,269

(22) Filed: Apr. 14, 2000

Related U.S. Application Data

(60) Provisional application No. 60/165,380, filed on Nov. 12, 1999.

(51) Int. Cl.⁷ ................................................ B01J 19/08
(52) U.S. Cl. ............. 204/176; 422/186.07; 422/186.11; 422/186.19; 422/186.2
(58) Field of Search ........................ 422/186.07, 186.11, 422/186.19, 186.2; 204/176

(56) References Cited

U.S. PATENT DOCUMENTS

| | | |
|---|---|---|
| 4,095,115 A | 6/1978 | Orr, Jr. et al. |
| 4,167,466 A | 9/1979 | Orr, Jr. et al. |
| 5,332,555 A | 7/1994 | Hosokawa et al. |
| 5,624,734 A | 4/1997 | Rees et al. |
| 5,756,054 A | 5/1998 | Wong et al. |
| 5,785,824 A * | 7/1998 | Kitayama et al. ...... 422/186.07 |
| 6,193,852 B1 * | 2/2001 | Caracciolo et al. .... 422/186.11 |

OTHER PUBLICATIONS

"Ozone in Water Treatment, Application and Engineering, Cooperative Research Report," pp. 432–437, Edited by Bruno Langlais, David A. Reckhow and Deborah R. Brink (no date available).

* cited by examiner

Primary Examiner—K. Mayekar
(74) Attorney, Agent, or Firm—Haynes and Boone, LLP; Michael J. Balconi-Lamica

(57) ABSTRACT

A method and apparatus for generating a polyatomic form of a prescribed element is disclosed. The apparatus includes a chamber and a plasma source. The plasma source is coupled to the chamber for producing plasma of the prescribed element from a supply of the element in a gaseous state. The plasma includes at least a mixture of single atomic and double atomic species of the prescribed element. Lastly, a quencher is disposed within the chamber proximate an output of the plasma source for facilitating generation of the polyatomic form of the prescribed element from the mixture of single atomic and double atomic species of the prescribed element. In one embodiment, the element is oxygen and the polyatomic form is ozone.

54 Claims, 6 Drawing Sheets

METHOD AND APPARATUS FOR EFFICIENT SURFACE GENERATION OF PURE O₃

This application claims the benefits of the earlier filed provisional application Ser. No. 60/165,380 filed Nov. 12, 1999.

BACKGROUND

1. Field of the Invention

The present invention relates generally to a methodology of generating ozone, and more particularly, to a method and apparatus for efficient surface generation of high concentration ozone and liquid ozone.

2. Discussion of the Related Art

Prior to the embodiments of the present disclosure, generation of ozone ($O_3$) with high concentration (e.g., on the order of greater than twenty-five percent (25%)) and high rate of pure $O_3$ generation have not been possible. A majority of the known state-of-the-art $O_3$ generation is accomplished through corona discharge, which has a yield on the order of around ten to fifteen percent (10–15%) maximum and at a low generation rate. Usage of $O_3$ has typically been limited to a low concentration (e.g., less than fifteen percent (<15%) and the generating of $O_3$ constrained to being generated at the point-of-use.

Another method of ozone generation is UV ozone generation, which has an even lower concentration yield as compared to electric discharge ozone generation. A third and less popular method is electrolytic ozone generation. With electrolytic ozone generation, aqueous solutions of sulfuric or perchloric acid are electrolyzed with extremely high anodic current densities. In the later instance, oxygen ($O_2$) and, in the case of sulfuric acid solutions, peroxydisulfuric acid, $H_2S_2O_8$, are by-products.

Accordingly, a method and apparatus for the generation of high concentration $O_3$ at the point-of-use (or at other than the point-of-use), and at a substantially limitless scalable production rate and volume are desired.

SUMMARY

According to one embodiment, an apparatus for generating ozone ($O_3$) includes a chamber and a plasma source. The plasma source couples to the chamber and produces oxygen plasma from a supply of oxygen. The plasma includes at least a mixture of O and $O_2$ species. Lastly, a quencher is disposed within the chamber proximate an output of the plasma source for facilitating ozone generation from the mixture of O and $O_2$ species.

A technical advantage provided by the embodiments of the present disclosure is the generation of high concentration $O_3$ at the point-of-use or location other than the point-of-use. In addition, the present embodiments provide the ability for achieving a substantially limitless scalable production rate and volume of high concentration $O_3$.

DETAILED DESCRIPTION

Figure 1:
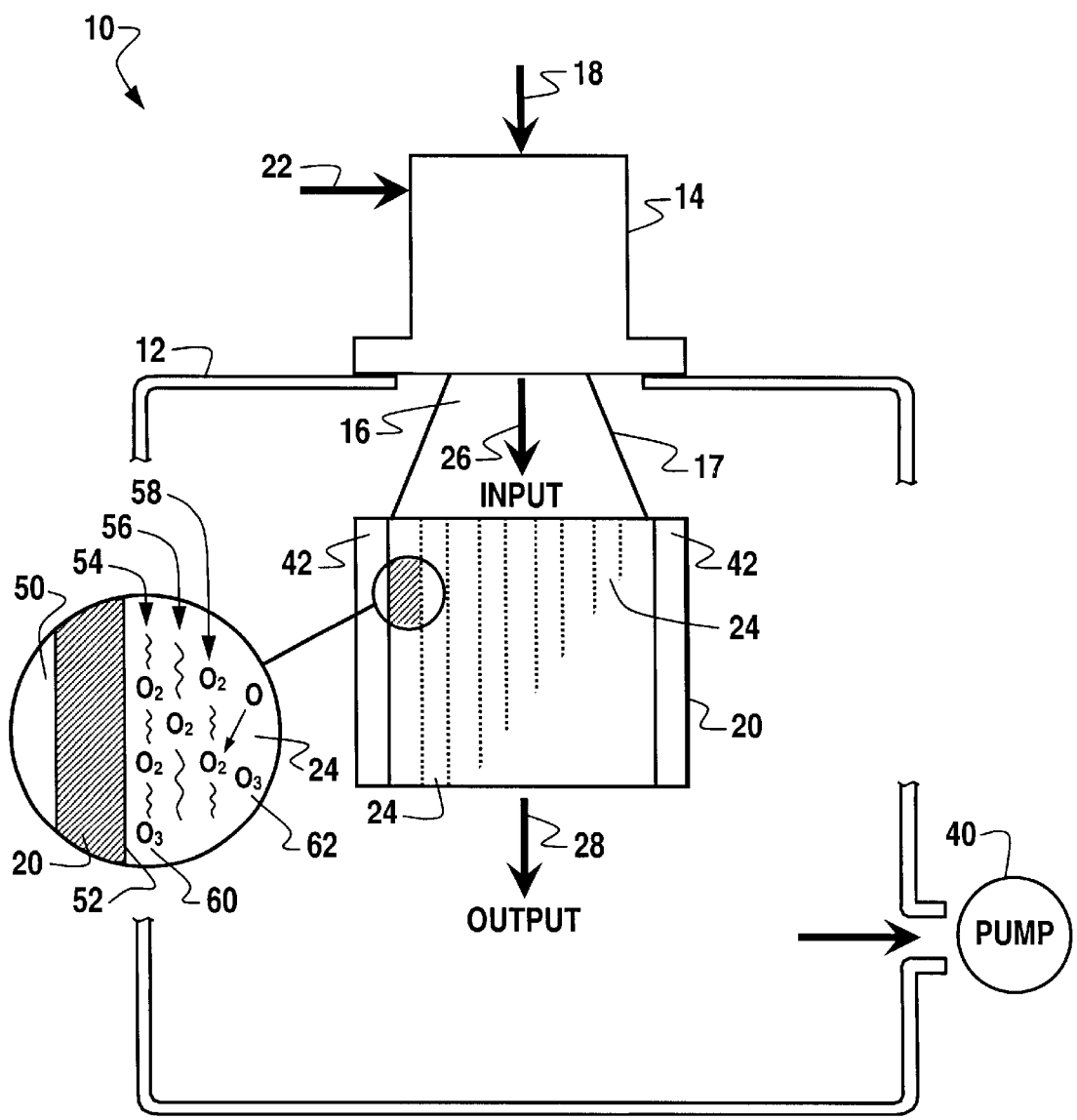
FIG. 1 illustrates a schematic view of an apparatus for surface generation of ozone according to an embodiment of the present disclosure.
Figure 1:
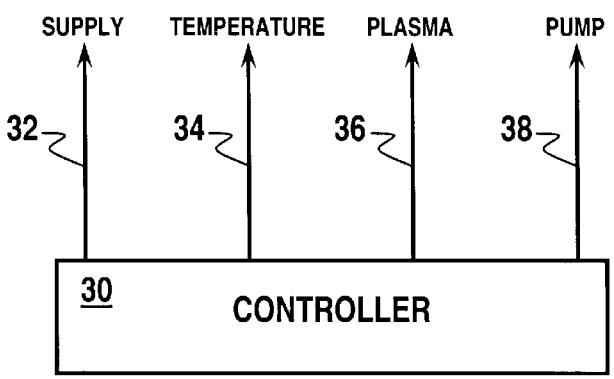

With reference now to FIG. 1, an apparatus 10 for generating ozone ($O_3$) includes a chamber 12, such as a vacuum chamber or other suitable chamber. A plasma source 14 couples to the chamber 12 for producing oxygen plasma 16 from a supply of oxygen 18. The plasma 16 includes at least a mixture of O and $O_2$ species. A quencher 20 is disposed within the chamber 12 proximate an output of the plasma source 14 for facilitating ozone generation from the mixture of O and $O_2$ species. The plasma source 14 includes an R.F. plasma source, a microwave source, or other suitable plasma sources. Electrical power is supplied to plasma source 14 as indicated by reference numeral 22.

The quencher 20 includes a quenching surface located down-stream of the plasma source within a prescribed region 17 of the oxygen plasma 16, such as in the plasma plume. The oxygen plasma flows across the quenching surface to generate ozone. In one embodiment, the quenching surface includes a plurality of quenching surfaces. Still further, the plurality of quenching surfaces include a plurality of flow channels 24 having inputs 26 and outputs 28, the inputs 26 being disposed proximate the output of the plasma source 14.

System apparatus 10 further includes a controller 30. Controller 30 includes any suitable programmable controller or computer for use in controlling various process parameters of the present method and apparatus. Process parameters are selected according to a prescribed process parameter window for a given ozone generation application (or for generation of a poly-atomic molecular form of a prescribed element). Controller 30 is programmed for performing desired functions as discussed herein. Programming may be accomplished using techniques well known in the art, thus not discussed further herein.

Controller 30 provides appropriate control signals for supply gas control 32, temperature control 34, plasma control 36, and vacuum pump control 38. Vacuum pump 40 provides a desired vacuum within chamber 12, as may be required for a given application. Controller 30 provides additional control signals, as may be needed, for control of additional parameters of a prescribed process window.

The apparatus 10 for generating ozone further includes means for controlling a temperature of the quencher in a prescribed manner for producing a desired form of liquid-phase or gas-phase ozone. Temperature control includes providing a thermal channel 42 in communication with the quencher 20 suitable for passage of a prescribed coolant through the thermal channel. The temperature control further includes controlling a flow rate of coolant through the thermal channel, such as, with a controllable flow valve or regulator (not shown). Controller 30 provides a temperature control signal 34, which may be used for controlling the flow valve or regulator, as appropriate. The coolant may include liquid nitrogen, liquid helium, liquid oxygen, or other suitable coolant.

As shown in FIG. 1, an enlarged view 50 of a portion of a flow channel 24 is shown. The enlarged view 50 illustrates several layers of adsorbed $O_2$ on the quencher surface 52 of a flow channel 24. The layers of adsorbed $O_2$ are characterized by an inner layer 54, intermediate layer (or layers) 56, and an outer layer 58, as discussed further herein below. Briefly, O from the mixture of $O_2$ and O collide with the $O_2$ from an outer layer 58 to produce $O_3$. Depending upon the process parameters, $O_3$ in the liquid phase 60 migrates to the quencher surface 52 (or $O_3$ in the gas phase 62 flows within channel 24) to the output 28 of the respective flow channel 24.

With respect to a method for generating ozone ($O_3$), the method includes providing a chamber, such as a vacuum chamber or other suitable chamber. The method further includes providing a plasma source coupled to the chamber for producing oxygen plasma from a supply of oxygen. The plasma includes at least a mixture of O and $O_2$ species. Lastly, a quencher is disposed within the chamber proximate an output of the plasma source for facilitating ozone generation from the mixture of O and $O_2$ species. The plasma source includes an R.F. plasma source, a microwave source, or other suitable source.

Providing the quencher includes providing a quenching surface located down-stream of the plasma source within a prescribed region of the oxygen plasma, wherein the oxygen plasma flows across the quenching surface to generate ozone. In one embodiment, the quenching surface includes a plurality of quenching surfaces. The plurality of quenching surfaces include a plurality of flow channels having inputs and outputs, the inputs disposed proximate the output of the plasma source.

The method further includes controlling a temperature of the quencher in a prescribed manner for producing a desired form of liquid-phase or gas-phase ozone. Controlling the temperature of the quencher includes providing a thermal channel in communication with the quencher suitable for passage of a prescribed coolant through the thermal channel. Controlling the temperature further includes controlling a flow rate of coolant through the thermal channel. In one embodiment, the coolant includes liquid nitrogen, liquid helium, liquid oxygen, or other suitable coolant.

According to another embodiment, a method of generating ozone ($O_3$) includes supplying oxygen to a plasma source; igniting and producing an oxygen plasma with the plasma source, and directing the oxygen plasma for movement over a quenching surface of a quencher. The oxygen plasma contains a mixture of O and $O_2$. The quenching surface is positioned down-stream of the plasma source within a prescribed region of the oxygen plasma. The oxygen plasma flows across the quenching surface to facilitate ozone generation from the mixture of O and $O_2$. The quenching surface includes a plurality of flow channels disposed within the quencher, the flow channels having inputs and outputs. The flow channel inputs are arranged proximate an output of the plasma source.

The method further includes controlling a temperature of the quenching surface in a prescribed manner for producing a desired form of liquid-phase or gas-phase ozone. In addition, the temperature of the quenching surface may also be regulated. Regulating the temperature includes controlling the flow rate of a coolant flowing through a cooling channel disposed in the quencher. The coolant may include liquid nitrogen, liquid helium, liquid oxygen, or other suitable coolant.

The present embodiments further include an apparatus for generating a polyatomic form of a prescribed element. The apparatus includes a chamber, a plasma source coupled to the chamber, and a quencher. The plasma source produces plasma of the prescribed element from a supply of the element in a gaseous state. Accordingly, the plasma includes at least a mixture of single atomic, double atomic and polyatomic species of the prescribed element. The quencher is disposed within the chamber proximate an output of the plasma source.

The quencher facilitates generation of the polyatomic form of the prescribed element from the mixture of single atomic, double atomic and polyatomic species of the prescribed element. Similar to the other embodiments, the plasma source includes an R.F. plasma source, a microwave source, or other suitable plasma source. The quencher includes a quenching surface located down-stream of the plasma source within a prescribed region of the plasma. The plasma flows across the quenching surface to generate the polyatomic form of the prescribed element. The quenching surface includes a plurality of quenching surfaces, further including a plurality of flow channels having inputs and outputs. The flow channel inputs are disposed proximate an output of the plasma source.

The embodiment further includes a means for controlling a temperature of the quencher in a prescribed manner for producing a desired liquid-phase or gas-phase polyatomic form of the prescribed element. The temperature control means includes a thermal channel in communication with the quencher suitable for passage of a prescribed coolant through the thermal channel. The temperature control means further includes means for controlling a flow rate of coolant through the thermal channel. The coolant includes liquid nitrogen, liquid helium, liquid oxygen, or other suitable coolant. The prescribed element can include oxygen and the polyatomic form of the prescribed element includes ozone ($O_3$).

The embodiments of the present disclosure advantageously enable the generation of high concentration ozone ($O_3$), on the order of greater than fifty percent (>50%) and at a substantially limitless scalable production rate and volume. The present embodiments enable the production of liquid $O_3$ at a substantially limitless scalable production rate and volume, for example, by a chemical plant. Having a scalable production rate and volume enables the usage of pure $O_3$ without the limitation of point-of-use $O_3$ generation. Accordingly, liquid $O_3$ can be transported, for example, in a suitable 161° K refrigerated container or vessel.

A principal feature of the present embodiments is the surface $O_3$ generation through quenching of an oxygen ($O_2$) plasma. Oxygen ($O_2$) gas of reasonable purity, or of a prescribed concentration level, is fed into a discharge vessel of $O_2$ plasma. In one embodiment, the purity of the $O_2$ gas is on the order of between 99% to 99.999%. It is noted that other purities of $O_2$ gas can be used, however, the purity of the supply will influence the purity of generated ozone.

The $O_2$ plasma produces a substantially controllable ratio of O and $O_2$ mixture. With the oxygen plasma alone, $O_3$ can be formed through a three-body collision in the gas-phase. This three-body collision can be expressed as $O+O_2+h/\lambda \rightarrow O_3$, where h is the Planck's constant ($6.63 \times 10^{-34}$ joules-second, $\lambda$ is the wavelength of vibration, and $h/\lambda$ represents a phonon (i.e., a quantum of vibrational energy). The expression $O+O_2+h/\lambda \rightarrow O_3$ maintains the laws of conservation of momentum and the conservation of energy. The third body $h/\lambda$ is involved since the physical laws state that simultaneous conservation of both momentum and energy in a two-body only collision is impossible.

The probability of a three-body collision in the gas phase, however, is extremely low. In addition, the plasma is generally very hot. The very hot plasma exponentially accelerates the decomposition of any $O_3$ that may have formed. Accordingly, using $O_2$ plasma alone, the $O_3$ concentration resulting therefrom is extremely low.

The embodiments of the present disclosure employ a method of surface generation of $O_3$. On a prescribed surface, the reaction of gas molecules $O+O_2 \rightarrow O_3$ proceeds as a two-body process. The two-body process has a much higher probability than the three-body collision in the gas-phase using the plasma alone. The prescribed surface acts as the supplier of surface phonon.

The probability of two bodies of certain momentum colliding with each other directly on a surface, where the surface acts as a limitless supplier of phonon, is higher than that of three bodies colliding in space. However, the two-body process alone is not extremely efficient in generating high concentration $O_3$. Accordingly, the surface generation method of the present disclosure carries the two-body process one step further. That is, one body, namely O, collides with a "phonon and $O_2$ supply" surface to generate the desired output, $O_3$.

To carry out the surface generation method of the present disclosure, the plasma is made to flow across a prescribed surface area that is maintained at a temperature lower than that of the plasma. The prescribed surface area is of sufficient size and area to increase the probability of the plasma engaging the surface. Accordingly, the surface area is sufficient to guarantee that particles hit the surface (i.e., a large surface area with respect to the particle size).

The combination of surface area and surface temperature facilitate a process wherein $O_2$ from the plasma adsorbs (either physisorbs and/or chemisorbs) on the surface. The adsorbed $O_2$ creates at least one thin layer, up to several or more molecular layers, of $O_2$. Adsorption is defined as the adhesion in an extremely thin layer of molecules (as of gases, solutes, or liquids) to the surface of solid bodies or liquids with which they are in contact. Accordingly, the adsorbed $O_2$ on the cold surface forms an $O_2$ and phonon supply surface. The O from the plasma collides with the adsorbed $O_2$, whereby $O_3$ is immediately formed, generally upon one collision.

The type of collision characterized by O from the plasma colliding with adsorbed $O_2$ can be viewed as a single-body colliding with a relatively large surface with limitless supply of phonon. The probability of such collision is close to one (i.e. almost a certainty). The temperature of the generation surface and that of the space near the generation surface is maintained sufficiently low (in comparison to the plasma temperature), such that the formed $O_3$ remains stable.

Referring again to FIG. 1, as O collides with the $O_2$ on an outer layer 58 of the adsorbed $O_2$, $O_3$ is formed. Upon the formation of $O_3$, additional adsorbed $O_2$ migrates and/or bubbles up from an inner layer 54 (or intermediate layer 56) to the outer layer 58, such that the process of $O_3$ formation continues. In other words, the layers (or layer) of adsorbed $O_2$ beneath the outer layer supply additional $O_2$ for subsequent $O_3$ generation. In addition, upon generation, the $O_3$ flows in a direction away from the plasma, either in gas-phase or liquid-phase. In an alternate embodiment, an inert gas is added to the $O_2$ supply gas to assist in transporting formed $O_3$ away from and/or off of the $O_3$ generation surface.

The prescribed surface for use in $O_3$ generation is referred to herein as a quencher. The quencher is characterized by a structure of cold surfaces relative to the plasma temperature. The quencher is generally placed proximate an output boundary of the plasma. More particularly, the quencher is placed in the path of the plasma plume proximate the output boundary of the plasma.

The concentration ratio of O and $O_2$ is controllable, for example, by the feed gas $O_2$ flow rate, ambient pressure, and power input to the plasma, etc. The temperature of the quencher surface is also controllable. For example, the temperature can be controlled by one or more suitable means, such as, the type of coolant used and the coolant flow rate through coolant channels within the quencher. The type of adsorption (whether physisorption or chemisorption) is controllable, for example, by the type of surface material and/or surface chemical of the quencher. Plasma flow and the corresponding flow pattern for facilitating ozone generation are controllable, for example, by a combination of the shape of the quencher, the characteristic bends and shapes of the flow channels, and the quencher flow channel surface shape(s). The overall shape of the quencher and the quencher's surface shape can be configured by varying or changing the physical design of the quencher as may be required for a particular implementation.

To obtain a maximum concentration of generated $O_3$ (on the order of approximately 100%), a prescribed range of the process window parameters can be assembled and/or established. That is, a parameter window of process and hardware can be established within which i) all $O_2$ from the plasma that enter into the space of the quencher are adsorbed on the quencher surface and ii) wherein there is a sufficient amount of O, the O interacting with surface $O_2$, such that substantially all the O and surface $O_2$ in the quencher are consumed, becoming $O_3$. In addition, as discussed herein, the quencher surfaces are cold relative to the plasma temperature and therefore species inside the quencher space, such as gas-phase O, $O_2$, and $O_3$, are significantly colder than that in the plasma by an approximate order of magnitude lower.

For example, in one embodiment, the temperature of the gas-phase plasma is approximately 800° K. The temperature of the quencher surface is approximately 100° K, and the temperature within the quencher space is approximately 200° K.

As mentioned herein above, gas-phase three-body generation of stable $O_3$ is still possible, although low in probability. A majority of $O_3$ is generated on the quencher surface. In addition to the above discussion, another important effect of the coldness of the quencher (including the surface and the space thereof) is to allow the existence of stable $O_3$ after its generation without suffering $O_3$ decomposition.

Figure 2:
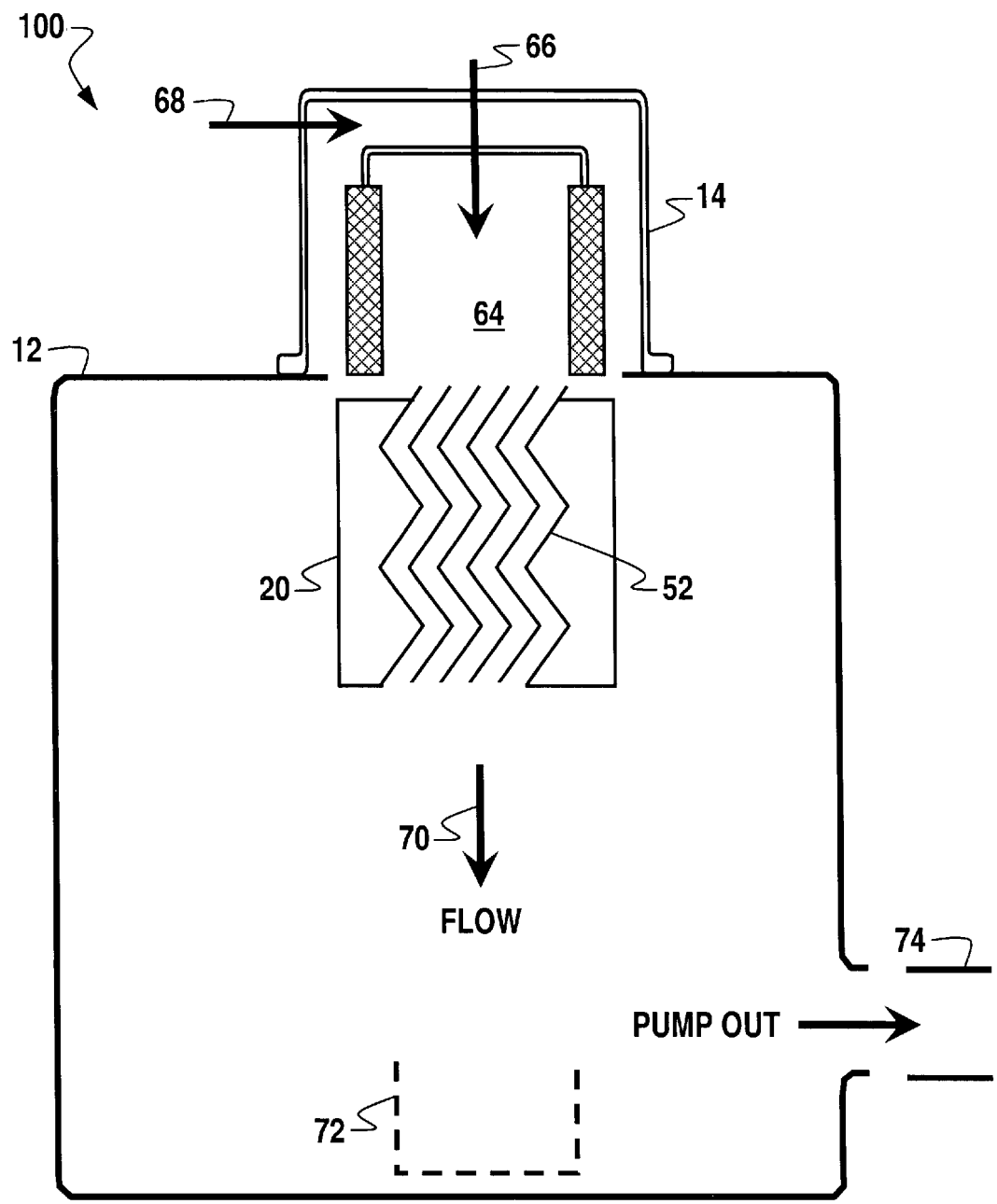
FIG. 2 illustrates a schematic view of an apparatus for surface generation of ozone according to another embodiment of the present disclosure.

FIG. 2 illustrates another embodiment 100 of the method and apparatus of the present disclosure. A plasma source 14 is mounted on a chamber 12, the chamber for housing the quencher 20 and the resulting $O_3$. The plasma source 14 includes a plasma tube 64. Plasma source 14 receives a supply of oxygen gas at inlet 66. Electrical power is supplied at 68. In this embodiment, it is desirable to avoid having plasma actively discharged into the space of the quencher 20 and in the region down-stream from the quencher, so as to eliminate unnecessary heating of the quencher by the plasma. However, this does not exclude having the plasma in the chamber that houses the quencher where, in a particular situation, extra heating of the quencher by the extra plasma is not a concern. Flow direction is indicated by arrow 70.

The plasma source 14 can include any type plasma heated by a suitable method, such as inductive heating, capacitive heating, DC heating or wave heating (e.g., ECR, Helicon, etc.). The quencher 20 is generally positioned proximate the output end of the plasma source. In one embodiment, the quencher 20 substantially occupies an entire area of the plasma output boundary for the purpose of achieving a higher efficiency.

The quencher 20 provides a large surface area (relative to the size of a particle), over which the species from the plasma (e.g., O, $O_2$) can flow across (or flow-by). The geometry of the quencher's flow-path (i.e., its surface 52) and the type of the flow condition are selected in a prescribed manner to allow sufficient interaction between the flow species (e.g., O, $O_2$, etc.) and the quencher's surfaces. The quencher's flow path and flow condition facilitate adsorption of $O_2$ on the cold quencher surfaces and collision of O with the adsorbed $O_2$, thereby leading to the surface generation of $O_3$. A suitable process control, such as provided via controller 30 of FIG. 1, adjusts the quencher surface temperature as required for a particular implementation.

It should be noted that the general methodology of surface $O_3$ generation from an $O_2$ plasma is not limited to physisorption. The flow-by $O_2$ or O can be placed on the surface through chemisorption, provided that an appropriate surface material is used. The main point is that the surface can always act as the source of phonon to supply the necessary momentum for the reaction of $O+O_2 \rightarrow O_3$. However, note that the particular reaction is not limited to the above reaction alone. There are other potential reaction channels through which $O_3$ can be generated on the quencher surface.

In connection with the present embodiments, the boiling point for $O_3$ is approximately 161° K, the boiling point for $O_2$ is 90° K, and the boiling point for $N_2$ is 77° K. In the case of generating high concentration or pure $O_3$ (gas phase), the quencher surface does not need to be as cold as the liquid-point at which the generated $O_3$ liquefies on the quencher surface under the chamber's particular pressure/temperature conditions. According to the present embodiments, as long as a the flow-by $O_2$ can sufficiently physisorb on the quencher surface for a given duration of time such that the flow-by O can interact with the adsorbed $O_2$ for the generation of $O_3$, the method of surface $O_3$ generation is satisfied.

In one embodiment, the newly generated $O_3$ can be physisorbed on the quencher surface. The physisorbed $O_3$ subsequently migrates down-stream away from the plasma and into the chamber for collection in a suitable collection vessel 72 and/or routing via suitable piping 74, as appropriate. In another embodiment, the newly generated $O_3$ may have gained enough thermal energy from the flow-by species that the newly generated $O_3$ itself is desorbed from the quencher surface and transported down-stream into the chamber for collection and/or routing, as appropriate. The coldness of the quencher surface cools down the gas-phase temperature, reducing and/or totally eliminating the probability of the decomposition of the generated/transported $O_3$.

In yet another embodiment, using a prescribed process window of chamber pressure and temperature conditions, generating pure $O_3$ is accomplished with the quencher surface at a temperature satisfying the liquid-point of the generated $O_3$ (i.e., lower than the previous example). For example, the quencher surface temperature can be selected such that, under the chamber's pressure and temperature conditions, the flow-by $O_2$ physisorb on the quencher surface (but the surface temperature need not be so low as to have the adsorbed $O_2$ accumulate into liquid $O_2$) for the surface $O_3$ generation process. This is followed by the liquefaction of the generated $O_3$ on the quencher surface. Under the appropriate chamber pressure and temperature condition, the quencher surface's liquid $O_3$ poses a vapor pressure that contributes to the output of the pure $O_3$. In addition, the plasma and the flow parameters can be adjusted as needed so that the substantial majority or entire flow-by $O_2$ are consumed for the production of high concentration or pure $O_3$ gas.

In the embodiments for producing liquid $O_3$ a suitable collection vessel provides for storage of the liquefied $O_3$. For example, storage can be provided using any suitable liquid storage container known in the art.

Figure 3:
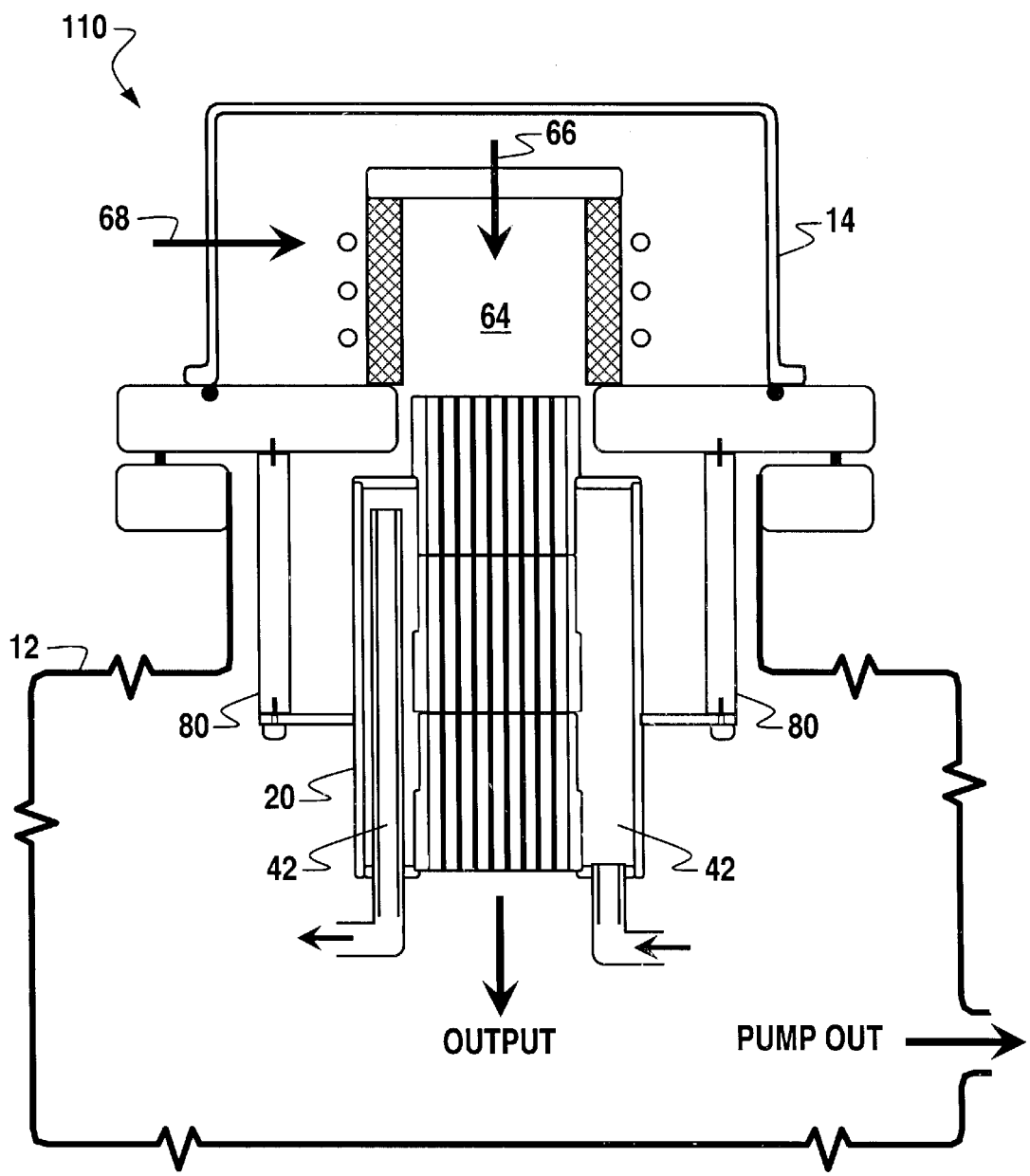
FIG. 3 illustrates a schematic view of an apparatus for surface generation of ozone according to another embodiment.

FIG. 3 illustrates another embodiment 110 of the method and apparatus for generation of $O_3$ according to the present disclosure. The plasma source 14 includes an inductive plasma. In this embodiment, the heated plasma volume is approximately 1.25" diameter ×3.5" long. The pure $O_2$ feed rate is typically centered at approximately one to two standard liters per minute (1–2 slm). The chamber 12 includes a stainless steel chamber such as that used within a typical laboratory environment. The chamber includes a volume on the order of approximately 16" diameter ×23" long.

Figure 4:
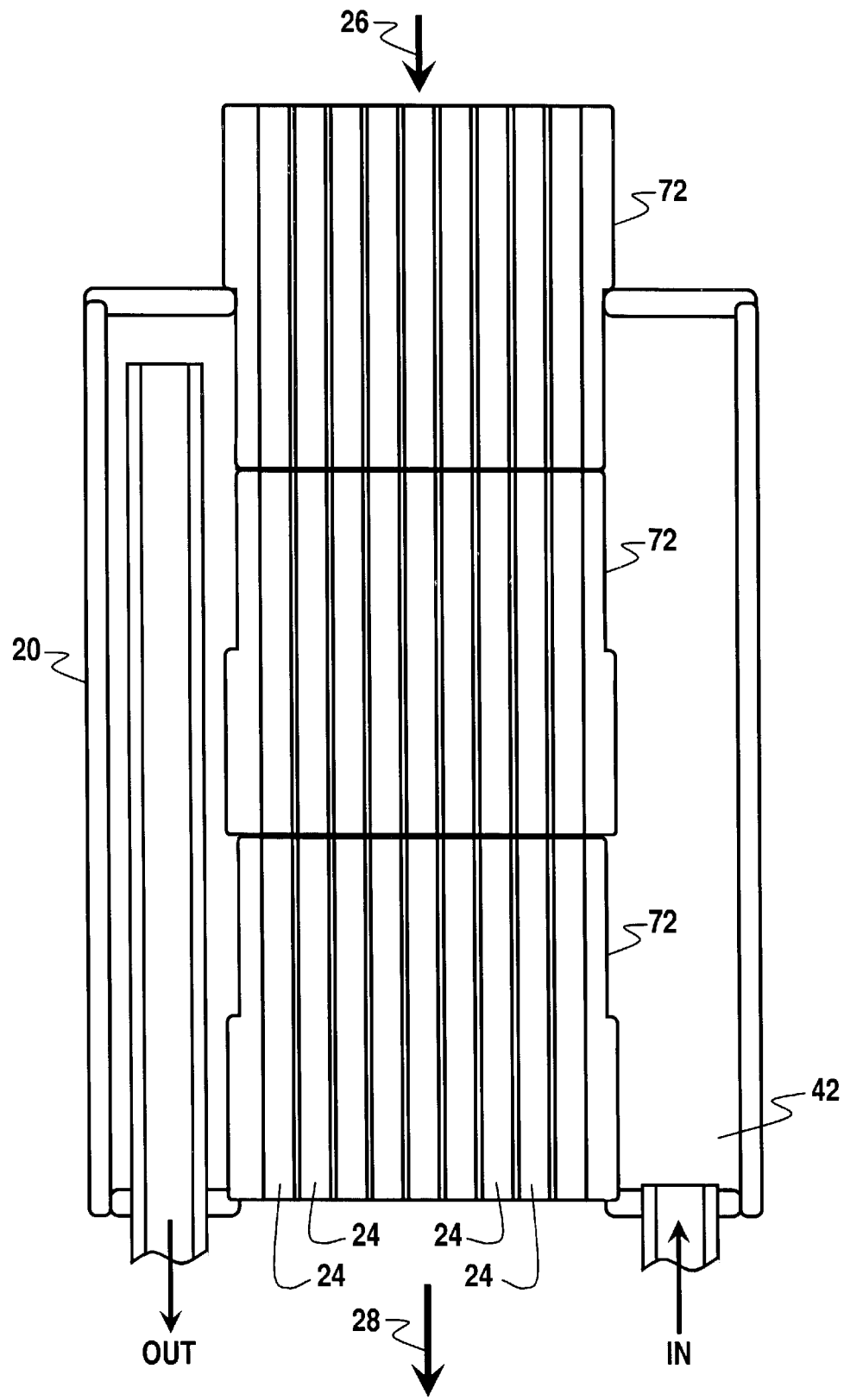
FIG. 4 illustrates a cross sectional view of a quencher of FIG. 3 in greater detail.
Figure 5A:
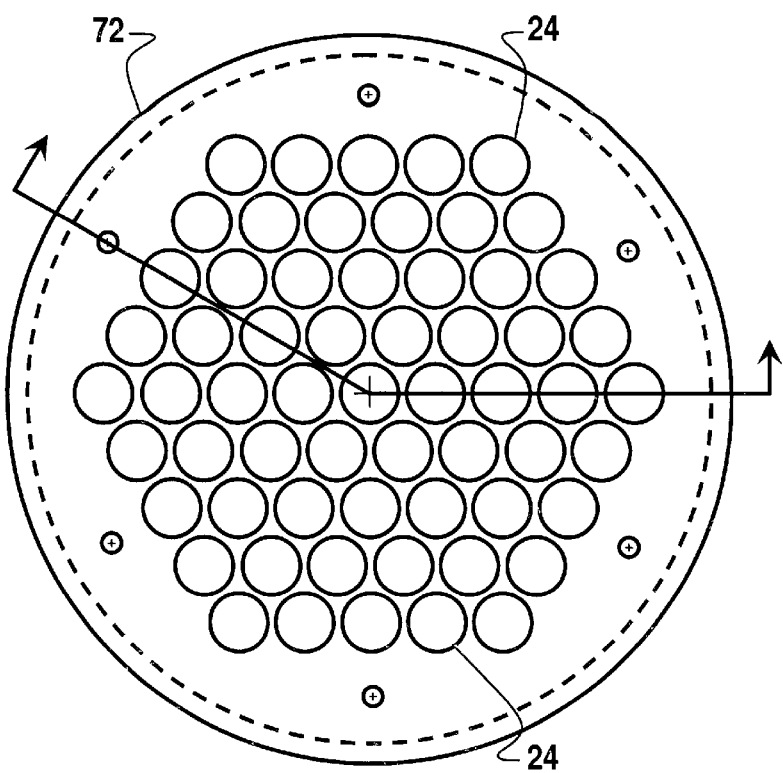
FIGS. 5A and 5B illustrate a top view and a cross section view of a portion of the quencher of FIG. 4.
Figure 5B:
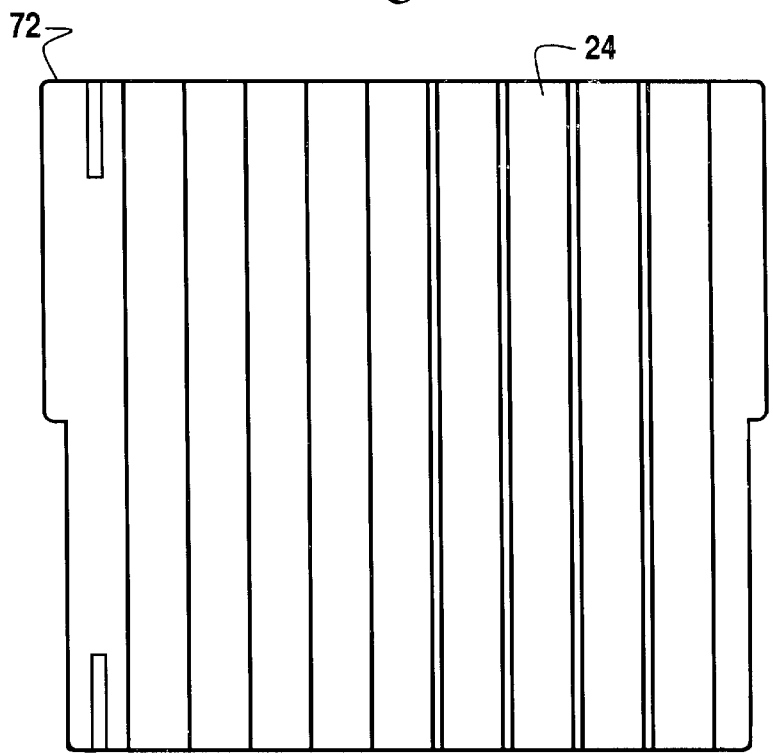

FIG. 4 illustrates a cross-section view of the exemplary quencher of FIG. 3 in greater detail. According to one embodiment, the quencher is characterized by a "flow channels" design. The flow channels 24 portion of the quencher assembly includes copper (Cu), for thermal considerations, with nickel (Ni) plating, for chemical protection. FIGS. 5A and 5B show a top view and a cross sectional view of one of the Cu/Ni members or pieces of the quencher 20, particularly illustrating the flow channels 24 in greater detail. In one embodiment, the quencher includes three Cu/Ni members or pieces that are silver-soldered together. Note that while this embodiment illustrates straight flow channels 24, it should be noted that the flow channels could also include prescribed bends and/or shapes to further increase an interaction between the flow species and the quencher's surfaces, as may be needed for a particular design implementation.

Referring to FIGS. 3–5, the quencher assembly is mounted proximate the output end of the plasma source using suitable fasteners 80. For example, thermal isolators or ceramic posts may be used. An input end 26 of the quencher 20 (i.e., a top surface thereof) is proximate to and borders a plasma body of a plasma to be produced by the plasma source 14. In one embodiment, the input end 26 of the quencher is disposed approximately 3 mm from an end of the plasma tube (or plasma body) of the plasma source 14. Suitable thermal insulation is provided between the quencher and the chamber wall area, for example, via an ambient vacuum gap.

In operation, according to one embodiment, the system 110 is first drawn into a vacuum of approximately 5 mtorr ($5 \times 10^{-3}$ torr). Subsequent to achieving an initial vacuum, liquid nitrogen ($LN_2$) cooling is introduced. That is, $LN_2$ circulates through cooling channels 42 at a prescribed flow rate to cool the quencher 20 to a temperature of approximately 80° K, wherein the surface of the quencher being approximately 110° K. This step is followed by the introduction of flow of $O_2$ and ignition of the plasma. In response to ignition of the plasma, the process of surface generation of $O_3$ begins. In one embodiment, the R.F. power for the plasma source is on the order of 1200 W, and the pressure in the plasma region of the plasma source is approximately on the order of 2 to 3 torr.

Accumulation of liquid $O_3$ on the quencher surfaces starts to occur almost immediately following the ignition of the plasma. As liquid $O_3$ accumulates thicker within the quencher, the liquid $O_3$ surface is subject to boil (i.e., via vaporization into the chamber) due to both the thermal isolation by the liquid $O_3$ itself from the quencher surface and the action of the flow-by species. At the entrance of the quencher assembly, the flow-by species are largely $O/O_2$ mixture. Towards the end of the quencher assembly, the flow-by species becomes largely $O_3$ (i.e., the desorbed $O_3$ or vaporized $O_3$). For example, with a proper adjustment of the initial $O/O_2$ mixture from the plasma and the total flow rate, a substantially complete depletion of $O_2$ can be accomplished at the exit of the quencher assembly. Accordingly, the desorbed $O_3$ accumulates in and/or fills a down-stream area of the chamber. The $O_3$ in the chamber can then be drawn out by the vacuum pump. In addition, the $O_3$ can be stored in a suitable container, routed, and/or delivered to a prescribed oxidation application.

The examples presented herein are illustrative only and not intended to restrict the present embodiments. The present embodiments include a methodology for manufacture of pure $O_3$, high concentration $O_3$, and liquid $O_3$. Other suitable apparatus can be assembled for carrying out the methodology of surface $O_3$ generation through the quenching of $O_2$ plasma.

The initial adsorption of the flow-by species ($O/O_2$) can be accomplished through either physisorption (in this case, the physisorption of $O_2$ on a cold surface), or chemisorption by a surface of the adequate material (in this case, the chemisorption of O or $O_2$). Also, the surface uptake of flow-by species could be a combination of physisorption and chemisorption. For example, in the above discussed implementation of FIG. 4, it is possible, although believed low in occurrence, that some flow-by O gets weakly chemisorbed on the quencher surface and surface $O_3$ is subsequently formed by a flow-by $O_2$ or other flow-by single molecule oxygen (O). It is important to significantly lower the gas-phase species temperature as the species flow through the "surface apparatus," to a point that is much lower than that of the plasma so that the probability of $O_3$ decomposition is drastically reduced.

Apparatus or hardware for collection of liquid $O_3$ includes any suitable existing technology, which can be applied for use in the collection and storage of liquid $O_3$. For gas $O_3$, the liquid $O_3$ on the surfaces of the quencher assembly is allowed to vaporize and expand. The vaporized $O_3$ is then pumped out for storage and/or delivery to the particular oxidation application.

While the present embodiments include a method and apparatus for producing pure $O_3$, the method and apparatus for producing pure $O_3$ further include applications requiring high concentration $O_3$, pure $O_3$, and liquid $O_3$. As a point-of-use $O_3$ source, the present embodiments can be applied for sterilization, cleaning, deodorizing and general oxidation. Liquid $O_3$ can also be stored and transported to a use location, other than the $O_3$ production location, to be dispensed for use in similar applications. For example, liquid $O_3$ can be used as an oxidizer of the rocket fuel in a rocket, thereby significantly reducing the volume and mass of the rocket at launch.

Figure 6:
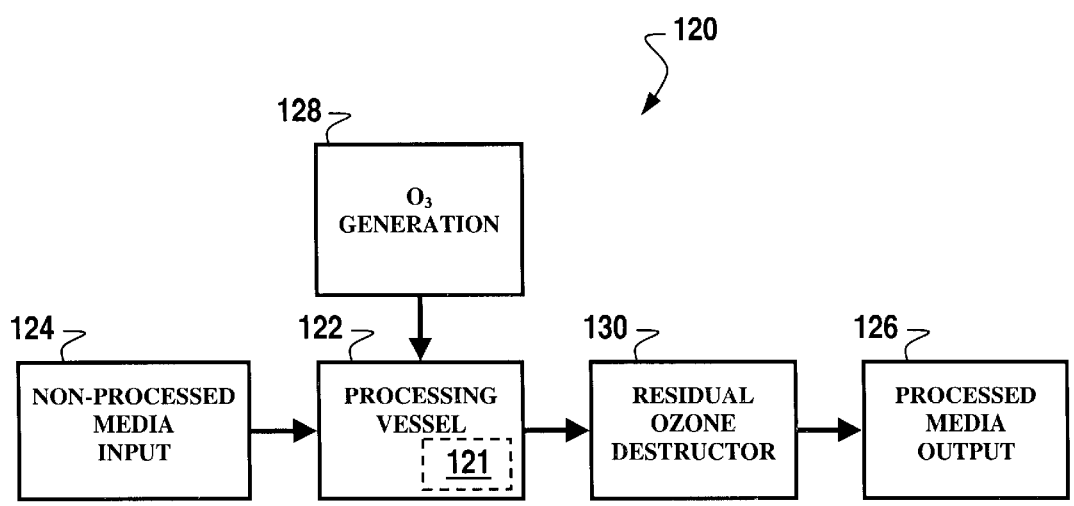
FIG. 6 illustrates a block diagram view of a system apparatus for processing media utilizing the method and apparatus for surface generation of ozone of the present disclosure.

Turning now to FIG. 6, the present embodiments further include a system 120 for processing media 121 with ozone ($O_3$). The media processing system 120 includes at least one processing vessel 122; suitable means 124 for disposing media to be processed into the at least one processing vessel; and means 126 for removing the processed media from said at least one processing vessel.

In addition, the media processing system includes means 128 for supplying ozone to the at least one processing vessel 122 to facilitate a processing of the media 121 by the ozone. The ozone supplying means 128 is similar to that discussed herein with respect to FIGS. 1–3. The ozone supplying means includes a chamber, a plasma source coupled to the chamber, and a quencher disposed with the chamber proximate an output of the plasma source. The plasma source produces an oxygen plasma from a supply of oxygen, the plasma including at least a mixture of O and $O_2$ species. The quencher facilitates ozone generation from the mixture of O and $O_2$ species.

The processing system may also include a means 130 for destroying residual ozone subsequent to a processing of the media. The residual ozone destructor 130 includes any suitable means known in the art for reducing the level of residual ozone to a prescribed safe level. The residual ozone destructor 130 is used in conjunction with removal of the media from the processing chamber, further in preparation for discharge, for example, into atmosphere.

The present embodiments further include a method for processing media with ozone ($O_3$). The method includes providing at least one processing vessel, disposing the media to be processed into the at least one processing vessel, supplying ozone to the at least one processing vessel to facilitate a processing of the media by the ozone, and removing the processed media from the at least one processing vessel subsequent to processing of the media by the ozone. In addition, the method includes destroying residual ozone subsequent to ozone processing of the media.

For the method of processing media, a prescribed ozone generator supplies the ozone. The ozone generator includes a generator as discussed herein with respect to FIGS. 1–3. The ozone generator includes a chamber, a plasma source coupled to the chamber for producing oxygen plasma from a supply of oxygen, and a quencher disposed within the chamber proximate an output of the plasma source. The plasma includes at least a mixture of O and $O_2$ species. The quencher facilitates ozone generation from the mixture of O and $O_2$ species.

In one embodiment, the at least one processing vessel 122 of the media processing system and method 120 includes a processing chamber. The processing chamber is characterized by an input and an output. The means 124 for disposing media into the processing chamber couples to the input of the processing chamber. The means 126 for removing the processed media from the processing chamber couples to the output of the processing chamber. In one embodiment, the processing chamber input and output represent a single portal.

In another embodiment, the media processing system and method 120 are utilized in the manufacture of semiconductor devices. In this instance, the at least one processing vessel 122 includes a semiconductor substrate processing chamber and the media includes a semiconductor substrate.

In another embodiment, the media processing system and method 120 are utilized for bioremediation of a gas, liquid, or solid media. In this instance, the at least one processing vessel 122 includes a bioremediation processing chamber and the media includes one of the following selected from the group consisting of gaseous media, liquid media, and solid media.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. An apparatus for generating ozone ($O_3$) comprising:
a chamber;
a plasma source coupled to said chamber for producing an oxygen plasma from a supply of oxygen, the plasma including at least a mixture of O and $O_2$ species; and
a quencher disposed within said chamber proximate an output of said plasma source for generation of ozone from the mixture of O and $O_2$ species, said quencher configured to generate ozone by adsorption on a surface of said quencher.

2. The apparatus of claim 1, wherein said plasma source includes one of the following selected from the group consisting of a radio frequency (RF) plasma source and a microwave source.

3. The apparatus of claim 1, wherein the surface of said quencher includes an ozone generation surface located down-stream of said plasma source within a prescribed region of the oxygen plasma, wherein the O and $O_2$ species of the oxygen plasma operate to flow across the ozone generation surface, in which one of the O and $O_2$ species of the oxygen plasma adsorbs to the ozone generation surface while the other of the O and $O_2$ species of the oxygen plasma collides with the adsorbed species, to generate ozone.

4. The apparatus of claim 3, further wherein the ozone generation surface includes a plurality of ozone generation surfaces.

5. The apparatus of claim 4, still further wherein the plurality of ozone generation surfaces include a plurality of flow channels having inputs and outputs, the inputs disposed proximate the output of said plasma source.

6. The apparatus of claim 1, further comprising:
means for controlling a temperature of said quencher in a prescribed manner for producing a desired form of liquid-phase or gas-phase ozone.

7. The apparatus of claim 6, wherein said temperature control means includes a thermal channel in communication with said quencher suitable for passage of a prescribed coolant through the thermal channel.

8. The apparatus of claim 7, wherein said temperature control means further includes means for controlling a flow rate of coolant through the thermal channel.

9. The apparatus of claim 7, wherein the coolant includes one of the following selected from the group consisting of liquid nitrogen, liquid helium, and liquid oxygen.

10. The apparatus of claim 1, wherein the surface of said quencher includes an ozone generation surface having a combination of surface area and surface temperature in which $O_2$ from the oxygen plasma adsorbs on the ozone generation surface, the adsorbed $O_2$ creating at least one molecule layer of $O_2$ to form an $O_2$ phonon supply surface, and further wherein O from the oxygen plasma collides with the adsorbed $O_2$ to form ozone.

11. The apparatus of claim 10, further wherein the $O_2$ from the oxygen plasma adsorbs on the ozone generation surface by at least one of physisorption and chemisorption.

12. The apparatus of claim 1, wherein the surface of said quencher includes an ozone generation surface having a combination of surface area and surface temperature in which O from the oxygen plasma adsorbs on the surface, the adsorbed O creating at least one molecule layer of O to form an O phonon supply surface, and further wherein $O_2$ from the oxygen plasma collides with the adsorbed O to form ozone.

13. The apparatus of claim 12, further wherein the O from the oxygen plasma adsorbs on the ozone generation surface by at least one of physisorption and chemisorption.

14. An apparatus for generating ozone ($O_3$) comprising;
a chamber;
a plasma source coupled to said chamber for producing an oxygen plasma from a supply of oxygen, the plasma including at least a mixture of O and $O_2$ species; and
a quencher disposed within said chamber primate an output of said plasma source for generation of ozone from the mixture of O and $O_2$ species, said quencher configured to generate ozone by adsorption on a surface of said quencher, wherein the surface of said quencher includes a plurality of ozone generation surfaces located down-stream of said plasma source within a prescribed region of the oxygen plasma, the plurality of ozone generation surfaces including flow channels having inputs and outputs, the inputs disposed proximate the output of said plasma source, wherein the O and $O_2$ species of the oxygen plasma operate to flow across the ozone generation surfaces, in which one of the O and $O_2$ species of the oxygen plasma adsorbs to the ozone generation surfaces while the other of the O and $O_2$ species of the oxygen plasma collides with the adsorbed species, to generate ozone; and
means for controlling a temperature of said quencher in a prescribed manner for producing a desired form of liquid-phase or gas-phase ozone, said control means including at least one channel in thermal communication with said quencher suitable for passage of a prescribed coolant through the channel, said control means further including a controllable flow valve for controlling a flow rate of coolant through the channel.

15. A method for generating ozone ($O_3$) comprising:
providing a chamber;
providing a plasma source coupled to the chamber for producing an oxygen plasma from a supply of oxygen, the plasma including at least a mixture of O and $O_2$ species; and
disposing a quencher within the chamber proximate an output of the plasma source for facilitating ozone generation from the mixture of O and $O_2$ species, the quencher configured to generate ozone by adsorption on a surface provided by the quencher.

16. The method of claim 15, wherein providing the plasma source includes providing one of the following selected from the group consisting of a radio frequency (RF) plasma source and a microwave source.

17. The method of claim 15, wherein providing the surface of the quencher includes providing an ozone generation surface located down-stream of the plasma source within a prescribed region of the oxygen plasma, wherein the O and $O_2$ species of the oxygen plasma flow across the ozone generation surface, in which one of the O and $O_2$ species of the oxygen plasma adsorbs to the ozone generation surface while the other of the O and $O_2$ species of the oxygen plasma collides with the adsorbed species, to generate ozone.

18. The method of claim 17, wherein the ozone generation surface includes a plurality of ozone generation surfaces.

19. The method of claim 18, further wherein the plurality of ozone generation surfaces include a plurality of flow channels having inputs and outputs, the inputs disposed proximate the output of the plasma source.

20. The method of claim 15, further comprising:
controlling a temperature of the quencher in a prescribed manner for producing a desired form of liquid-phase or gas-phase ozone.

21. The method of claim 20, wherein controlling the temperature of the quencher includes providing a thermal channel in communication with the quencher suitable for passage of a prescribed coolant through the thermal channel.

22. The method of claim 21, wherein controlling the temperature further includes controlling a flow rate of coolant through the thermal channel.

23. The method of claim 21, wherein the coolant includes one of the following selected from the group consisting of liquid nitrogen, liquid helium, and liquid oxygen.

24. The method of claim 15, wherein the surface of the quencher includes an ozone generation surface having a combination of surface area and surface temperature in which $O_2$ from the oxygen plasma adsorbs on the ozone generation surface, the adsorbed $O_2$ creating at least one molecule layer of $O_2$ to form an $O_2$ phonon supply surface, and further wherein O from the oxygen plasma collides with the adsorbed $O_2$ to form ozone.

25. The method of claim 24, further wherein the $O_2$ from the oxygen plasma adsorbs on the ozone generation surface by at least one of physisorption and chemisorption.

26. The method of claim 15, wherein the surface of the quencher includes an ozone generation surface having a combination of surface area and surface temperature in which O from the oxygen plasma adsorbs on the surface, the adsorbed O creating at least one molecule layer of O to form an O phonon supply surface, and further wherein $O_2$ from the oxygen plasma collides with the adsorbed O to form ozone.

27. The method of claim 26, further wherein the O from the oxygen plasma adsorbs on the ozone generation surface by at least one of physisorption and chemisorption.

28. A method for generating ozone ($O_3$) comprising:

providing a chamber;

providing a plasma source coupled to the chamber for producing an oxygen plasma from a supply of oxygen, the plasma including at least a mixture of O and $O_2$ species;

disposing a quencher within the chamber proximate an output of the plasma source for generation of ozone from the mixture of O and $O_2$ species, the quencher configured to generate ozone by adsorption on a surface of the quencher, wherein the surface of the quencher includes a plurality of ozone generation surfaces located down-stream of the plasma source within a prescribed region of the oxygen plasma, the plurality of ozone generation surfaces including flow channels having inputs and outputs, the inputs disposed proximate the output of the plasma source, wherein the O and $O_2$ species of the oxygen plasma flow across the ozone generation surfaces, in which one of the O and $O_2$ species of the oxygen plasma adsorbs to the ozone generation surfaces while the other of the O and $O_2$ species of the oxygen plasma collides with the adsorbed species, to generate ozone; and controlling a temperature of the quencher in a prescribed manner for producing a desired form of liquid-phase or gas-phase ozone, wherein controlling the temperature includes providing at least one channel in thermal communication with the quencher suitable for passage of a prescribed coolant through the channel and providing a controllable flow valve for controlling a flow rate of coolant through the channel.

29. A method of generating ozone ($O_8$) comprising:

supplying oxygen to a plasma source;

igniting and producing an oxygen plasma with the plasma source, the oxygen plasma including a mixture of O and $O_2$ species; and directing the oxygen plasma for movement over an ozone generation surface of a quencher, the ozone generation surface located down-stream of the plasma source within a prescribed region of the oxygen plasma, wherein the O and $O_2$ species of the oxygen plasma flow across the ozone generation surface for generation of ozone from the mixture of O and $O_2$ species, the quencher configured to generate ozone by adsorption on the ozone generation surface of the quencher.

30. The method of claim 29, further comprising:

controlling a temperature of the ozone generation surface in a prescribed manner for producing a desired form of liquid-phase or gas-phase ozone.

31. The method of claim 29, wherein the ozone generation surface includes a plurality of flow channels disposed within the quencher, the flow channels having inputs and outputs, the inputs arranged proximate an output of the plasma source.

32. The method of claim 31, further comprising:

regulating a temperature of the ozone generation surface.

33. The method of claim 32, wherein regulating the temperature includes controlling the flow rate of a coolant flowing through a cooling channel disposed in the quencher.

34. The method of claim 33, wherein the coolant includes one of the following selected from the group consisting of liquid nitrogen, liquid helium, and liquid oxygen.

35. An apparatus for generating a polyatomic form of a prescribed element comprising:

a chamber;

a plasma source coupled to said chamber for producing plasma of the prescribed element from a supply of the element in a gaseous state, the plasma including at least a mixture of single atomic and double atomic species of the prescribed element; and a quencher disposed within said chamber proximate an output of said plasma source for generation of the polyatomic form of the prescribed element from the mixture of single atomic and double atomic species of the prescribed element, said quencher configured to generate the polyatomic form of the prescribed element by adsorption on a surface of said quencher.

36. The apparatus of claim 35, wherein said plasma source includes one of the following selected from the group consisting of a radio frequency (RF) plasma source and a microwave source.

37. The apparatus of claim 35, wherein the surface of said quencher includes a generation surface located down-stream of said plasma source within a prescribed region of the plasma, wherein the single atomic and double atomic species of the plasma operate to flow across the generation surface, in which one of the single atomic and double atomic species of the plasma adsorbs to the generation surface while the other of the single atomic and double atomic species of the plasma collides with the adsorbed species, to generate the polyatomic form of the prescribed element.

38. The apparatus of claim 37, further wherein the generation surface includes a plurality of generation surfaces.

39. The apparatus of claim 38, still further wherein the plurality of generation surfaces include a plurality of flow channels having inputs and outputs, the inputs disposed proximate the output of said plasma source.

40. The apparatus of claim 35, further comprising:

means for controlling a temperature of said quencher in a prescribed manner for producing a desired liquid-phase or gas-phase polyatomic form of the prescribed element.

41. The apparatus of claim 40, wherein said temperature control means includes a thermal channel in communication with said quencher suitable for passage of a prescribed coolant through the thermal channel.

42. The apparatus of claim 41, wherein said temperature control means further includes means for controlling a flow rate of coolant through the thermal channel.

43. The apparatus of claim 41, wherein the coolant includes one of the following selected from the group consisting of liquid nitrogen, liquid helium, and liquid oxygen.

44. The apparatus of claim 35, wherein the prescribed element includes oxygen and the polyatomic form of the prescribed element includes ozone ($O_3$).

45. A system for processing media with ozone ($O_3$) comprising:

at least one processing vessel;

means for disposing media to be processed into said at least one processing vessel;

means for supplying ozone to said at least one processing vessel to facilitate a processing of the media by the ozone, said ozone supplying means including a chamber, a plasma source coupled to the chamber for producing an oxygen plasma from a supply of oxygen, the plasma including at least a mixture of O and $O_2$ species, and a quencher disposed within the chamber proximate an output of the plasma source for generation of ozone from the mixture of O and $O_2$ species, the quencher configured to generate ozone by adsorption on a surface of the quencher; and means for removing the processed media from said at least one processing vessel.

46. The system of claim 45, further comprising:

means for destroying residual ozone subsequent to a processing of the media.

47. The system of claim 45, wherein said at least one processing vessel includes a processing chamber, the processing chamber having an input and an output, wherein said means for disposing media into the processing chamber is coupled to the input of the processing chamber, and said means for removing the processed media from the processing chamber is coupled to the output of the processing chamber.

48. The system of claim 45, wherein said at least one processing vessel includes a semiconductor substrate processing chamber and the media includes a semiconductor substrate.

49. The system of claim 45, wherein said at least one processing vessel includes a bioremediation processing chamber and the media includes one of the following selected from the group consisting of gaseous media, liquid media, and solid media.

50. A method for processing media with ozone ($O_3$) comprising:

providing at least one processing vessel;

disposing media to be processed into the at least one processing vessel;

supplying ozone to the at least one processing vessel to facilitate a processing of the media by the ozone, wherein supplying ozone is provided by an ozone generator including a chamber, a plasma source coupled to the chamber for producing an oxygen plasma from a supply of oxygen, the plasma including at least a mixture of O and $O_2$ species, and a quencher disposed within the chamber proximate an output of the plasma source for generation of ozone from the mixture of O and $O_2$ species, the quencher configured to generate ozone by adsorption on a surface of the quencher; and removing the processed media from the at least one processing vessel subsequent to processing of the media by the ozone.

51. The method of claim 50, further comprising:

destroying residual ozone subsequent to ozone processing of the media.

52. The method of claim 50, wherein the at least one processing vessel includes a processing chamber, the processing chamber having an input and an output, wherein said disposing the media into the processing chamber is coupled through the input of the processing chamber and said removing the processed media from the processing chamber is coupled through the output of the processing chamber.

53. The method of claim 50, wherein the at least one processing vessel includes a semiconductor substrate processing chamber and the media includes a semiconductor substrate.

54. The method of claim 50, wherein the at least one processing vessel includes a bioremediation processing chamber and the media includes one of the following selected from the group consisting of a gaseous media and a porous solid media.

* * * * *

UNITED STATES PATENT AND TRADEMARK OFFICE
CERTIFICATE OF CORRECTION

PATENT NO.     : 6,372,097 B1
DATED          : April 16, 2002
INVENTOR(S)    : Chen, Yee Yvonne It is certified that error appears in the above-identified patent and that said Letters Patent is hereby corrected as shown below:

<u>Column 12,</u>
Line 6, after "chamber" delete "primate" and insert -- proximate --.

Signed and Sealed this

Third Day of June, 2003

JAMES E. ROGAN
*Director of the United States Patent and Trademark Office*